(12) United States Patent
Mejia et al.

(10) Patent No.: US 12,417,368 B2
(45) Date of Patent: Sep. 16, 2025

(54) DUAL INTERFACE SMART CARD

(71) Applicants: Protec Secure Card, Eatontown, NJ (US); TOPPAN HOGIER S.A.S., Bogotá DC (CO)

(72) Inventors: Juan Mejia, Rumson, NJ (US); Carlos Eduardo Gartner Valencia, Bogotá DC (CO)

(73) Assignees: PROTEC SECURE CARD; TOPPAN HOGIER S.A.S, Bogota DC (CO)

( * ) Notice: Subject to any disclaimer, the term of this patent is extended or adjusted under 35 U.S.C. 154(b) by 0 days.

(21) Appl. No.: 18/583,954

(22) Filed: Feb. 22, 2024

(65) Prior Publication Data

US 2024/0289584 A1    Aug. 29, 2024

Related U.S. Application Data

(60) Provisional application No. 63/447,953, filed on Feb. 24, 2023.

(51) Int. Cl.
*G06K 19/077* (2006.01)
*G06K 19/073* (2006.01)

(52) U.S. Cl.
CPC . *G06K 19/07722* (2013.01); *G06K 19/07309* (2013.01); *G06K 19/07767* (2013.01); *G06K 19/07769* (2013.01)

(58) Field of Classification Search
CPC ....... G06K 19/07722; G06K 19/07309; G06K 19/07767; G06K 19/07769; G06K 19/00; G06K 19/067; G06K 19/07
USPC ................. 235/492, 487, 380, 488
See application file for complete search history.

(56) References Cited

U.S. PATENT DOCUMENTS

| | | | |
|---|---|---|---|
| 2021/0192311 A1* | 6/2021 | Lotya | G06K 19/07747 |
| 2022/0092377 A1* | 3/2022 | Nam | B32B 38/10 |
| 2024/0070433 A1* | 2/2024 | Alexandre | G06K 19/07779 |
| 2024/0242055 A1* | 7/2024 | Devadiga | G06K 19/07722 |

* cited by examiner

*Primary Examiner* — Edwyn Labaze
(74) *Attorney, Agent, or Firm* — Gearhart Law LLC

(57) ABSTRACT

The present invention relates to a smart card and/or a payment card that has a dual interface, which optionally comprises one or more of a first antenna, a second antenna, a wire loop, various inlays, one or more metal layers, one or more printed PVC layers, and one or more contact, contactless, and/or integrated circuit chips. The first antenna and second antenna are part of a antenna segment inlay that is designed to fit snuggly into the contours of the one or ore metal layers.

17 Claims, 5 Drawing Sheets

DUAL INTERFACE SMART CARD

CROSS-REFERENCE TO RELATED APPLICATIONS

The present application claims priority under 35 USC 119(c) to U.S. Provisional Application No. 63/447,953 filed Feb. 24, 2023, the entire contents of which are incorporated by reference.

FIELD OF THE INVENTION

The present invention relates to a smart card and/or a payment card that has a dual interface, which optionally comprises one or more of a first antenna, a second antenna, a wire loop, various inlays, one or more metal layers, one or more printed PVC layers, and one or more contact, contactless, and/or integrated circuit chips.

BACKGROUND OF THE INVENTION

Most known contactless or hybrid contact/contactless chip cards include a pre-laminated insert including a card body made of plastic, an electronic module located in a cavity of the body of the insert and provided with a microchip, and an antenna placed in the body of the insert and electrically connected to output pads of the microchip. Some of these chip cards have an antenna placed in the card body, said antenna being arranged so as to be inductively coupled to the electronic module that itself is provided with an antenna.

Chip cards and their inserts have a format standardized according to standard ISO 7810, such as the physical dimensions, the resistance to excessive bending and to chemicals, temperature and humidity, and non-toxicity. As such, chip cards are in general made of plastic for reasons of cost and flexibility. The cards bending stiffness, non-toxicity, and resistance to chemicals should provide the cards with resistance to deterioration and durability. Most banking cards are of a size that is approximately 3.37" by 2.125" but other ID or smart cards may comprise other sizes.

ISO/IEC 7816 is a series of standards specifying integrated circuit cards and the use of such cards for interchange. These cards are identification cards intended for information exchange negotiated between the outside world and the integrated circuit in the card. As a result of an information exchange, the card delivers information (computation result, stored data) and/or modifies its content (data storage, event memorization). The different parts of ISO/IEC 7816 define the physical characteristics of cards with contacts (ISO/IEC 7816-1), the dimensions and locations of the contacts (ISO/IEC 7816-2), the electrical interface and transmission protocols or asynchronous card (ISO/IEC 7816-3), and other defining characteristics of cards with contacts.

However, a segment of the market that is seeing growth is that of contactless chip cards or hybrid contact/contactless chip cards that have physical characteristics that make them feel more exclusive or high-end, because of their greater weight, which ensures a more satisfying sensation when the card is handled.

A structure comprising two chips provided with booster antennae is known from document FR 2 936 075 A1, said structure being incorporated into a chip card in order to increase the range at which the chips may be read. The card body includes an electromagnetic perturbation system made of aluminum, but the aluminum film creates a shielding effect that prevents the booster antennae from being coupled to each other.

BRIEF SUMMARY OF THE INVENTION

The present invention relates to a smart card and/or a payment card that has a dual interface, which optionally comprises one or more of a first antenna, a second antenna, a wire loop, various inlays, one or more metal layers, one or more printed PVC layers, and one or more contact, contactless, and/or integrated circuit chips.

In an embodiment, the present invention relates to processes of making the dual interface cards of the present invention.

DETAILED DESCRIPTION OF THE INVENTION

Figure 1:
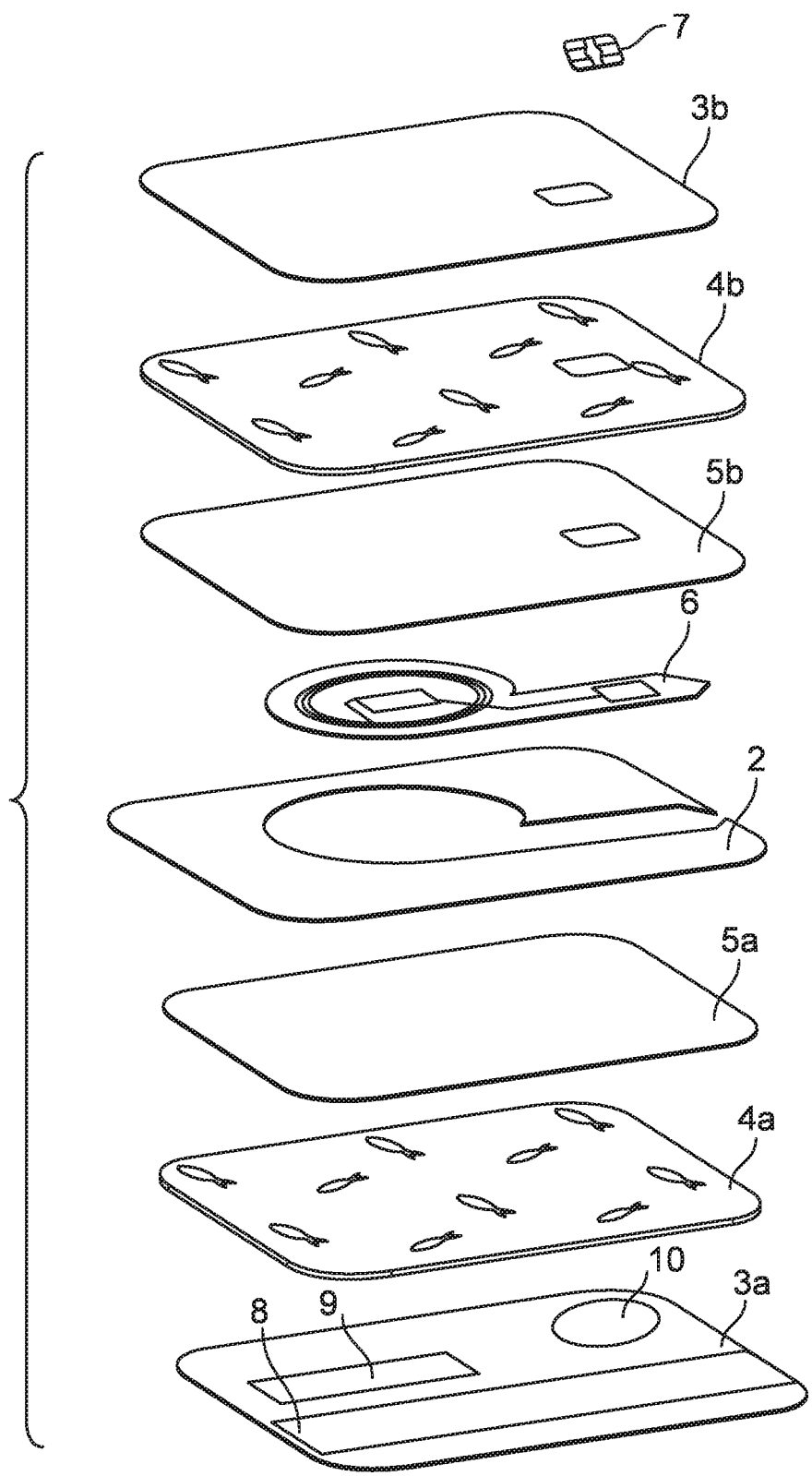
FIG. 1 shows a perspective view of the respective parts of the dual interface smart card and how they are positioned to make the final dual interface smart card product.

The present invention relates to a smart card and/or a payment card that has a dual interface, which optionally comprises one or more of a first antenna, a second antenna, a wire loop, various inlays, one or more metal layers, one or more printed PVC layers, and one or more contact, contactless, and/or integrated circuit chips.

In one embodiment, the present invention relates to a process that involves one or more of a prepress to create the layout of the smart card, printing the card, sheet steel pre die cutting the metal insert, designing and manufacturing the one or more antennas, assembling the card, laminating the card, punching the card, mechanizing the process, polishing the card, finishing the card, testing the card (e.g., quality control), and packing the card for shipment.

In an embodiment, the prepress involves having the manufacturer review the assembly order and color test, and if the assembly order or color test needs to be modified, return the data to a production assistant and/or a planning assistant so that the assembly order or color test can be modified (and/or validated with the commercial area). The In an embodiment, the metal comprises one or more of brushed stainless steel, brass, silver, copper, titanium, palladium, gold, or mixtures thereof.

In an embodiment, the present invention relates to contactless chip cards or chip-card inserts and the contactless chip card may comprise a plastic card that may be provided with a magnetic strip, and the card body may have a metal layer.

Inserting a metal plate into such cards may have adverse consequences from the electromagnetic point of view, since the metal plate forms a partial or even substantial shield, which in some cases, has the effect of blocking electromagnetic waves that would otherwise propagate between the contactless chip card and a chip-card reader. The contactless cards of the prior art suffered from a decrease or a failure in contactless communication performance, or in the operation of the card in contactless mode becoming at best asymmetric, i.e. to its operation in contactless mode being degraded on one side with respect to its operation on the other side.

In an embodiment, the present invention is able to obviate the problems of the prior art because the cards in one embodiment comprise metal plates on both sides of the card (i.e., a dual interface smart card). Thus, the cards of the present invention do not suffer from the asymmetric problems that the prior art cards did.

In an embodiment, the dual interface smart cards of the present invention may comprise a metal alloy that is aluminum or stainless steel, or combinations thereof. In an embodiment, the dual interface smart cards of the present invention may comprise titanium, gold, platinum, aluminum, stainless steel or combinations thereof.

In an embodiment, the card thickness is between about 0.6 and 1.0 mm in thickness. In a variation, the thickness may be between about 0.7 and 0.9 mm. In a variation, the thickness is about 0.8 mm. In an embodiment, the dimensions of the card are about 80-90 mm in length and about 50-60 mm in width. In a variation, the size of the card is about 85 mm by 54 mm. In an embodiment, the weight of the card is between about 24-35 grams, or alternatively, between about 25-30 grams or alternatively about 25-28 grams, or alternatively about 26-27 grams.

The invention will now be described with reference to the figures.

FIG. 1 shows a perspective view of the various parts of the dual interface smart card 1 and the relative positions of each of the parts show how they are put together. In the center of the dual interface smart card there is a metal sheet 2, which can be cut so that antennae segment inlay 6 can be inserted into the metal sheet 2. In an embodiment, the metal sheet 2 can be stainless steel. Alternatively and/or additionally it can be made of the metals that are described herein or combinations thereof. One advantage of the card as shown is that by cutting the metal sheet 2 to allow the insertion of the antennae segment inlay 6 allows the card to be read on either side of the card is able to be read by smart card readers as the metal sheet inhibits the ability of the smart card to be read on the side of the card if the metal sheet is between the card reader and the antenna.

On each side of metal sheet 2 are adhesive layers 5 (5a and 5b) that serve to hold the antennae segment inlay 6 in place. Adhesive layer 5b may have a hole present in it that is designed to accommodate chip 7. On each side of adhesive layers 5a and 5b are plastic layers 4a and 4b. The plastic layers 4a and 4b in an embodiment, are made of polyvinyl chloride acetate. The plastic may contain other additives. As is the case with adhesive layer 5b, plastic layer 4b may have a hole cut in it that is able to accommodate chip 7.

In an embodiment, the plastic layer 5a and 5b may be printed on to give the smart card designs and/or text.

Outside of the plastic layers 4a and 4b are transparent plastic overlay layers 3 (3a and 3b). These plastic over layers 3 can also be printed on and plastic overlay layer 3a may contain magnetic stripe 8, signature line 9, and optionally hologram 10. These layers may also have additional writing or designs on them. In an embodiment, these plastic overlay layers may be sufficiently thin so that they can be placed over plastic layers 4a and 4b, which may have embossed writing or an embossed design on them and the plastic overlay layers 3a and 3b when placed over plastic layers 4a and 4b conform to the embossed writing or design so that the embossed writing or design remains raised (so that a person can feel raised writing or design on the smart card). In an embodiment, the plastic overlay layers 3a and 3b may be made of polyvinyl chloride acetate. Other possible materials include polycarbonate or polylactic acid, and acrylonitrile butadiene styrene polymers. In an embodiment, polylactic acid is the plastic that is used in these smart cards because it is more readily biodegradable than polyvinyl acetate and therefore, more eco-friendly.

In an embodiment, plastic layers 4a and 4b may be replaced by paper. In a variation, the paper may be embossed with writing or designs in a similar manner to plastic layers 4a and 4b. The paper should be of a paper stock that is sufficiently thick so that it has the typical thickness of a smart card and also be sufficiently stiff so that it has the desirable stiffness properties of a smart card (e.g., a credit card, gift card, or debit card). In an embodiment, plastic layers 4a and 4b may be transparent. If plastic layer overlay layers 3a and 3b are transparent, and adhesive layers 5a and 5b are transparent, metal layer 2 should be visible from either side of the smart card. In this embodiment, metal layer can accommodate printing of words or designs that should be visible to a user of the smart card.

In an embodiment, the plastic layer 4b may be change to a metal layer to have the front side of the card full metal.

Figure 2:
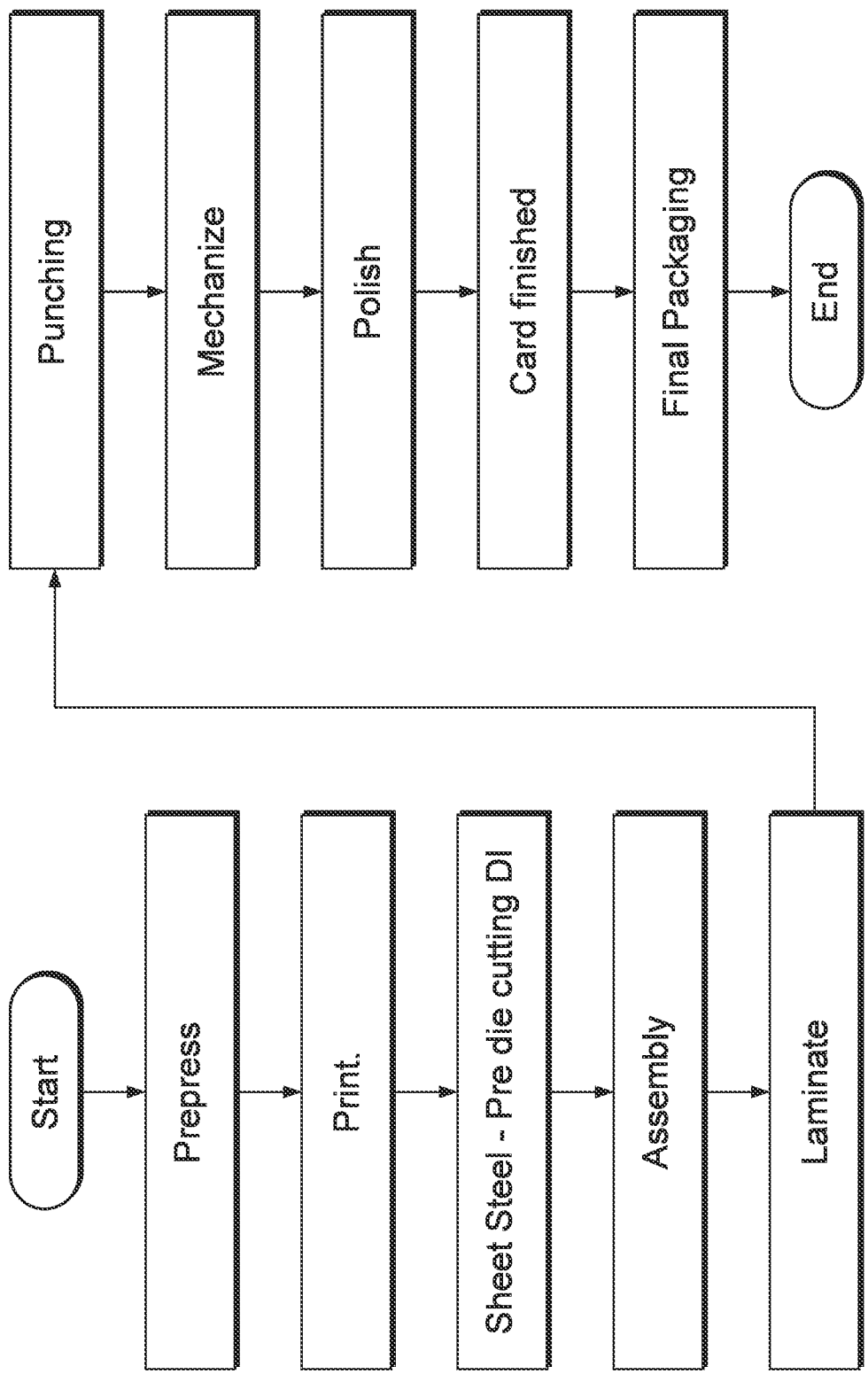
FIG. 2 shows a flowchart showing one embodiment of the process of making the dual interface smart card of the present invention from beginning to end.

FIG. 1 shows generally how the various parts of the smart card of the present invention is structured, but FIG. 2 shows a flow diagram of how the process of making the card occurs.

In an embodiment, the plastic for the smart card can be made by melting and mixing polyvinyl chloride acetate with additives. In one variation, the plastic sheet can be extruded using an extrusion molding apparatus. In one embodiment, the polyvinyl acetate mixture is added to the extrusion molding apparatus, which causes the heated molten plastic to be forced through a die (i.e., a small flat orifice). After passing through the die, the sheet encounters rollers that are stacked allowing the sheet to be pulled through the rollers. The rollers are designed to keep the sheet flat and maintain the proper thickness of the card. The sheets are long enough so that as the sheet of plastic progresses it goes from a hotter region to a cooler region, thereby cooling the plastic sheets. Eventually, the cooled sheet is cut by hot wires, by saws, or by shears to the correct size. The cards may pass through buffers that make sure that there is no extraneous unsmooth portions on the edges of the cards (after being cut).

FIG. 2 lays out the process by which a dual interface smart card can be made when the various parts are available. In a first step, the card is prepressed (i.e., a print layout is created) and optionally, a digital prepress machine accepts information electronically and transforms the printed data onto a printing plate, which will ultimately be used to transfer the printing data onto the metal card or onto the plastic layer that comprises what will eventually be a the dual interface smart card. In an embodiment, printing may occur on a sheet of plastic or metal wherein the sheet comprises a plurality of cards that will later be cut. For example, in an embodiment, the printing plate may be configured so that it will print identical information or nearly identical information on a sheet of PVC that will eventually be cut into a series of smart cards. The printing data may include a title of the card, it may contain a logo, and perhaps the name of the bank (or the entity that is issuing the card). It may comprise different colors and/or designs that are to be printed on the card. Alternatively, the prepress may be designed so that it only is designed to print the information on a single card.

The prepress step also involves a series of checks in the manufacturing process. These include checking the assembly order for color, for content, and for color proof. For example, the content should be checked for spelling of words and this process can be accomplished both by a human and/or by a computer or other device that is capable of checking spelling/grammar, etc. The machines may also be able to appropriately check color to ascertain that the correct color is chosen.

In a second step, printing occurs on the card or on the sheet that will comprise a plurality of the cards. The printing step may comprise laser printing. The printing may involve an engraving process wherein the card is engraved. The card may be printed on either the metal or on the plastic (e.g., the PVC) in a way that the user can see the printing that is on the card. In the manufacturing process, the printing step should also undergo a series of checks including verifying that the printing is going according to plan. The printing plates, the inks, and the other printing products should all be checked to verify that they are printing correctly. They should be checked to make sure that they are correctly positioned in the printer so as to avoid mishaps/smudging/other deficiencies. In an embodiment, a color test may be performed with a densitometer, a spectrodensitometer, or with the human eye or with another device that is able to accurately ascertain colors (and/or do comparison testing). In an embodiment, the LAB test should be performed. The LAB test tests for darkness/lightness, greenness/redness, and blueness/yellowness and is one test that allows one to ascertain if there is a good match with a known color.

In a third step, the pre-die cutting occurs. The purpose of the pre-die cutting is to assemble the metal card antenna die and adjust the die-cutting variables according to the needs of the job. The die-cutting operator receives the metal sheets that contain the antennae (see FIGS. 3 and 5), verifies that the antennae sheet(s) is/are compliant and prepares the sheets for die-cutting. Because a protective film is placed on the sheet that contains a plurality of antennae, the operator should remove the protective film from the sheet prior to starting the cutting process. Die-cutting tests should be carried out to verify that the die is in the correct position when cutting the sheets. In an embodiment, because the sheet that comprises the antennae have two antennae associated with each smart card (discussed in more detail below), care should be taken so as to not cut or damage either of the antennae that are to be inserted into the dual interface smart card. In this step, the operator should also punch the material by making one or more holes in the sheet in order to accommodate the chip that is to be inserted into the card as well as the guides to ensure that the cards will be properly aligned. In an embodiment, production auxiliaries make the assembly of the plastic insert that is to be inserted into the metallic sheets. The die-cut material is stacked taking care that it is not scratched or damaged. The metal sheet is also cut in this step that is to accommodate the antennae that is to be inserted into the metal sheet (see the metal layer 2 (metal sheet) and the antennae segment inlay 6 (antennae insert) in FIG. 1).

In a fourth step, the assembly of the dual interface smart card takes place. The assembly of the card is suggested by FIG. 1, which shows not just the various parts of the card, but also the relative positions of the various parts of the card.

In an embodiment, the present invention relates to using a heat activated adhesive to bond the inlay in the metal layer to the plastic layer (which may be printed upon). Typical adhesives that adhere to polyvinyl chloride should be used and the heat activation occurs at temperatures between about 130-150° C. The various layers should all be of a thickness so as to achieve a dual interface smart card that is of the correct thickness. For example, the plastic overlay layer may be on the order of about 60 microns in thickness, the plastic layer (with printing) may be on the order of about 100 microns, the metal layer may be on the order of about 400 microns, the antennae segment inlay may be on the order of 400 microns, and the adhesive layer may be on the order of about 20-30 microns. Typical credit cards are of a thickness that is approximately 0.76-0.78 mm thick so the above thicknesses will give deliver a dual interface smart card that is about the correct thickness (e.g., 400+60+60+100+100+20-30+20-30=760-780 microns). The other dimensions of the dual interface smart card should be of dimensions that satisfy ISO standards. The card, in an embodiment, is 8.56 cm in length (i.e., width) and 5.398 cm in height. In an embodiment, the hologram, if present, adds a security feature to the card. The hologram should reflect light, appear to be three dimensional, and the image should appear to move or shift when the card is tilted back and forth. The hologram is produced by using a three dimensional laser to take a photographic image of an object, which is then imprinted on one of the plastic overlay layers of the card. The signature line is a plastic upon which one can write and after it has been signed, the signature has a permanence. The chip is a dual interface chip which has two antennae associated with it.

In the manufacturing process of assembly, checks must be performed to ascertain that each card is being properly assembled. In an embodiment, an assembly operator will receive a production order and the operator should check the color (or verify the results of a previously done test) and verify the production specifications. The operator should verify that all material including the printed plastic layer (e.g., PVC), the metallic sheets, the adhesive layers and the plastic overlay layers are correct. The magnetic stripe should be adhered to the card and during assembly the operator should make sure that the magnetic stripe has the appropriate informational data associated with it. In an embodiment, the assembly is automized and can be performed by an assembly machine. The assembly machine can be adjusted to the size of the sheet according to a production order. The temperature and times on the machine should be adjusted so as to allow the adhesive sheet to allow adherence. In an embodiment, one should adjust the assembly register so that the assembly of the metal sheet, adhesive film, plastic layer (e.g., Printed PVC), and optionally, the overlay plastic occurs. In an embodiment, one should assemble one or a small number of sheets for testing. It the tests show that the card is properly assembled, then assembly can be set up on a larger scale. In assembling the dual interface smart card, after about every 50 sheets, a check should be made to make sure that the cards are being properly configured. This check is made to verify that the pull and withdrawal of the sheets coincide.

In the above process, the assembly may not involve the addition of the transparent plastic overlay layer but a step to add this may occur after the assembly step. This step is the laminate step, which is step five in the process. In an embodiment, the process involves a machine operator who will review the specifications of the production order. The machine operator sets and verifies that the parameters such as temperature, pressure and time are correctly set to allow lamination to occur without adversely affecting the type of printing on the plastic (PVC) layer.

The operator should verify that the thickness of the materials (assembled sheets), make sure he/she agrees with the production order and ISO (International Organization for Standardization) and/or CQM (Card Quality Management from MasterCard) requirements and that the assembled cards meet the requisite standards. The operator should select sheets based on format and material specification (Matte or Glossy), and make a test sheet. The laminating process should be carried out and the resulting laminated product should be tested for the printing, the sealing, the thickness and/or other process variables. A visual review should also be undertaken. The visual review should look for deficiencies such as printing damage such as register out of area, tone, and/or stains, among other deficiencies.

In a sixth step, punching occurs (i.e., manufacturing the holes in the card). In an embodiment, the correct steps should be followed for the dual interface metal card punching process. In an embodiment, a die cutter is used. A die cutter can be used in combination with another tool that "punches" the cut card so as to separate the cut portion from the rest of the card. The machine(s) should be configured according to the requirements of the production order. The operator should start the die-cutting process by adjusting the cards to the final size of the template for chip location for the metal card. The chip and card should be put together with separators to prevent scratches to the chip. In an embodiment, the process is automized (mechanized). As in the other steps in this process, quality control tests should be undertaken to ascertain that the card meets the appropriate specifications. The quality control involves ascertaining that the magnetic stripe and the chip are in the correct location. The test can be performed by visual inspection and this inspection should ensure that the card does not present any distortion of the magnetic stripe and chip (and that they will be inserted/added to the correct location on the card).

In a seventh step, mechanization occurs. The above enumerated step may be performed manually until the mechanization step occurs. The operator should verify that the chip insertion that was performed in the previous step was performed correctly. In an embodiment, the operator should review a production order and analyze all of the relevant characteristics including but not limited to quantity, quality and card dimensions. A mechanization machine that is computerized can be used wherein the operator selects the appropriate program and makes sure that all of the appropriate tools required for the chip insertion job are in place prior to starting the automation process. The operator should periodically check (e.g., by performing random quality checks) the automation process as it progresses to ensure that the metal dual interface card that is being produced is to specification. The check should involve removing the final product by partially opening the gate of a mechanization machine and gently blowing it with a hose to remove chip residue from the cards. The operator should subsequently open the door completely, and remove the cards manually. In an embodiment, quality control is performed and the operator inspects the mechanized cards with the registration templates to verify the position of the chip. The operator should inspect the card to make sur that all of the requisite parameters are correct such as the width and height of the card. This test can be performed with a template and/or a gauge.

In an eighth step, the card should be polished. The operator should visually inspect the cards to make sure that the prior steps have been performed to specification. In the polishing step, cards are sanded along the edges of the cards to remove any imperfections, metal shards, etc. The cards are then blown using a (high powered) blower to remove any residual chip residue. The cards should be cleaned with a solvent such as isopropyl alcohol (or alternatively, ethanol, methanol, acetone, or another appropriate solvent) that has relatively good volatility so that no residual solvent remains for long periods of time on the card. The card condition should be checked for any deficiencies such as to make sure that the magnetic stripe is in good condition and make sure that the card is free of oil, burrs, scratches and/or other particles. If the cards meet this quality check, the compliant cards are packed up and sent to the next process step.

In a ninth and tenth step, the card finishing and packaging occur. One or more of the following steps should be performed for the dual interface metal card finishing process.

In an embodiment, the card finishing process includes personalizing the cards so that they can be sent to the user that is to use the metal dual interface cards. In an embodiment, the card is given a personalized number that is associated with a particular user of the card. Moreover, a hologram implant may be added. The hologram may be a personalized image of the user that will be using the card that is sent to the user. Moreover, the chip at this stage of the process also has identifying personal indicia associated with the chip that associates the chip with the user. The finishing process also involves additional quality checks like verifying that the chip is implanted at the correct position of the card.

In an embodiment, the card may have heat shrink packaging applied to it in the packaging step.

The operator of the finishing procedure needs to perform quality checks to verify that the card meets the requisite specifications. The panel and hologram are integrated on the metal card, according to the requirements of the production order and the operator should verify that they meet the specifications of this integration. The quality control involves checking the position of the magnetic stripe and chip with a template. The thickness of the panel and hologram should be tested in accordance with ISO7810. An adhesion test should be made in accordance with ISO 2409CQM 9.1.36 that makes sure that the magnetic stripe are sufficiently adhered to the card.

Other quality control checks are made such as verifying that encrypted information that is put on the card meets the requisite requirements. Not only must one ascertain that the data storing features (the hologram, the magnetic stripe and the chip) are properly physically adhered to the card, but the thickness and tests of adherence robustness should be made. Moreover, in an embodiment, tests should be ascertained to make sure that the encryption is working and that the correct identifying indicia is associated with the card that is to be sent to the user (customer). The tests that are performed include a position check with template/CQM 11.2.3 (tests the location of contacts), the chop adhesion test/CQM 11.2.1 (which tests adhesion of the ICM to card), a chip thickness test CQM 11.2.2 (which tests the relative height of contacts), and a three wheel test, which is CQM 11.1.2 (which is a wheel test of robustness).

Figure 3:
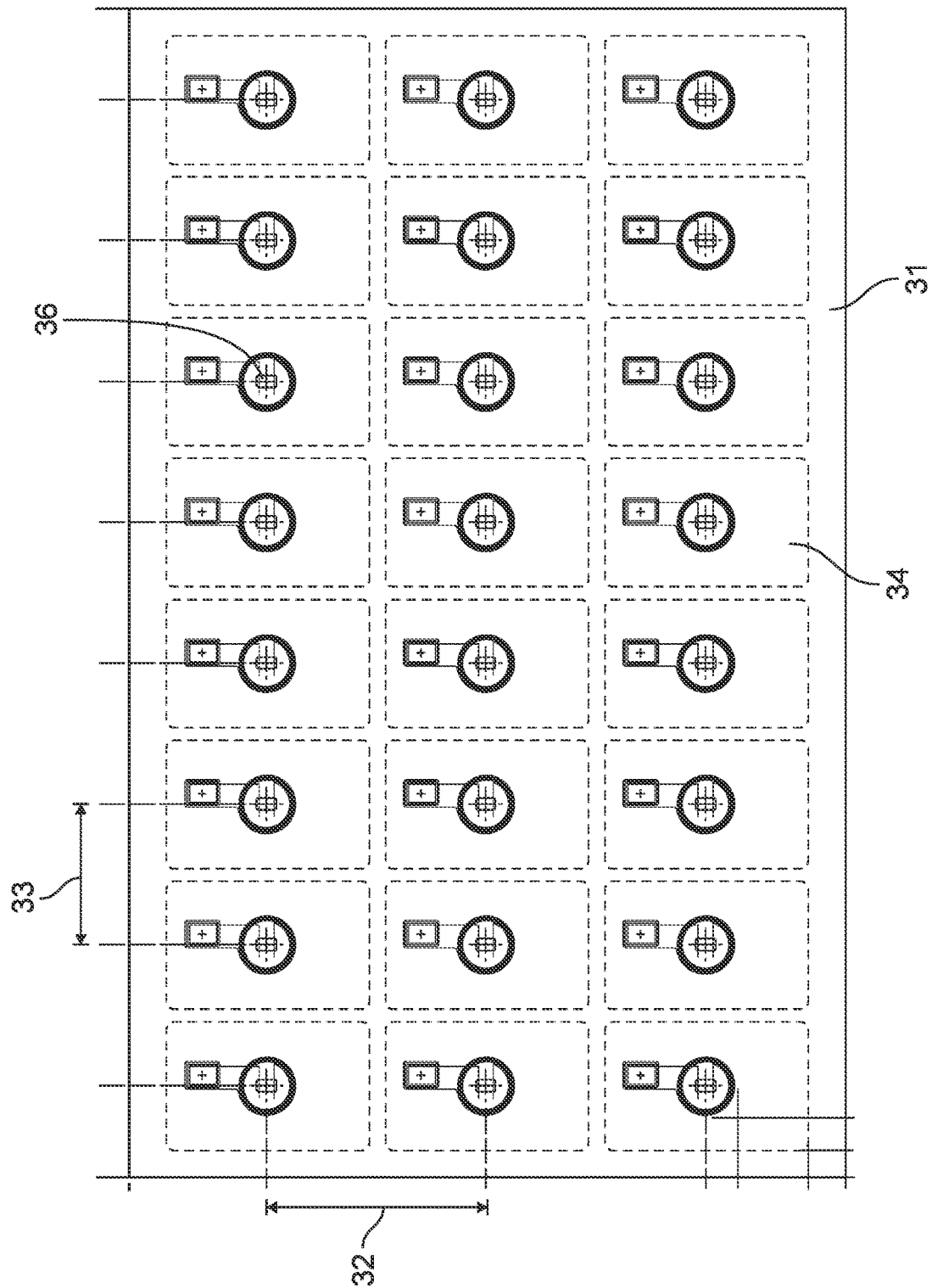
FIG. 3 shows a top down view of a sheet with a plurality of antennae prior to being cut so that each antenna can be inserted into a dual interface smart card.
Figure 4:
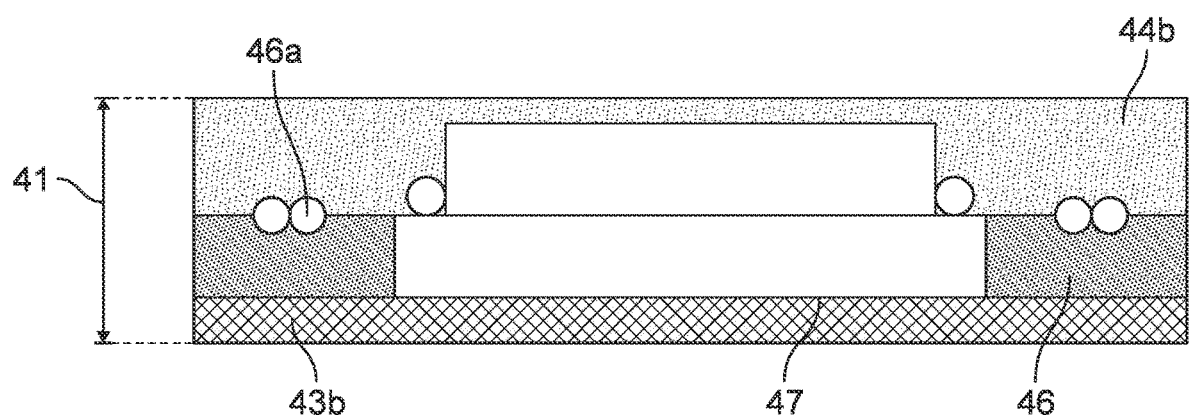
FIG. 4 shows a side view of the antennae segment inlay, which comprises a PVC portion and the antenna portion of the dual interface smart card.
Figure 5:
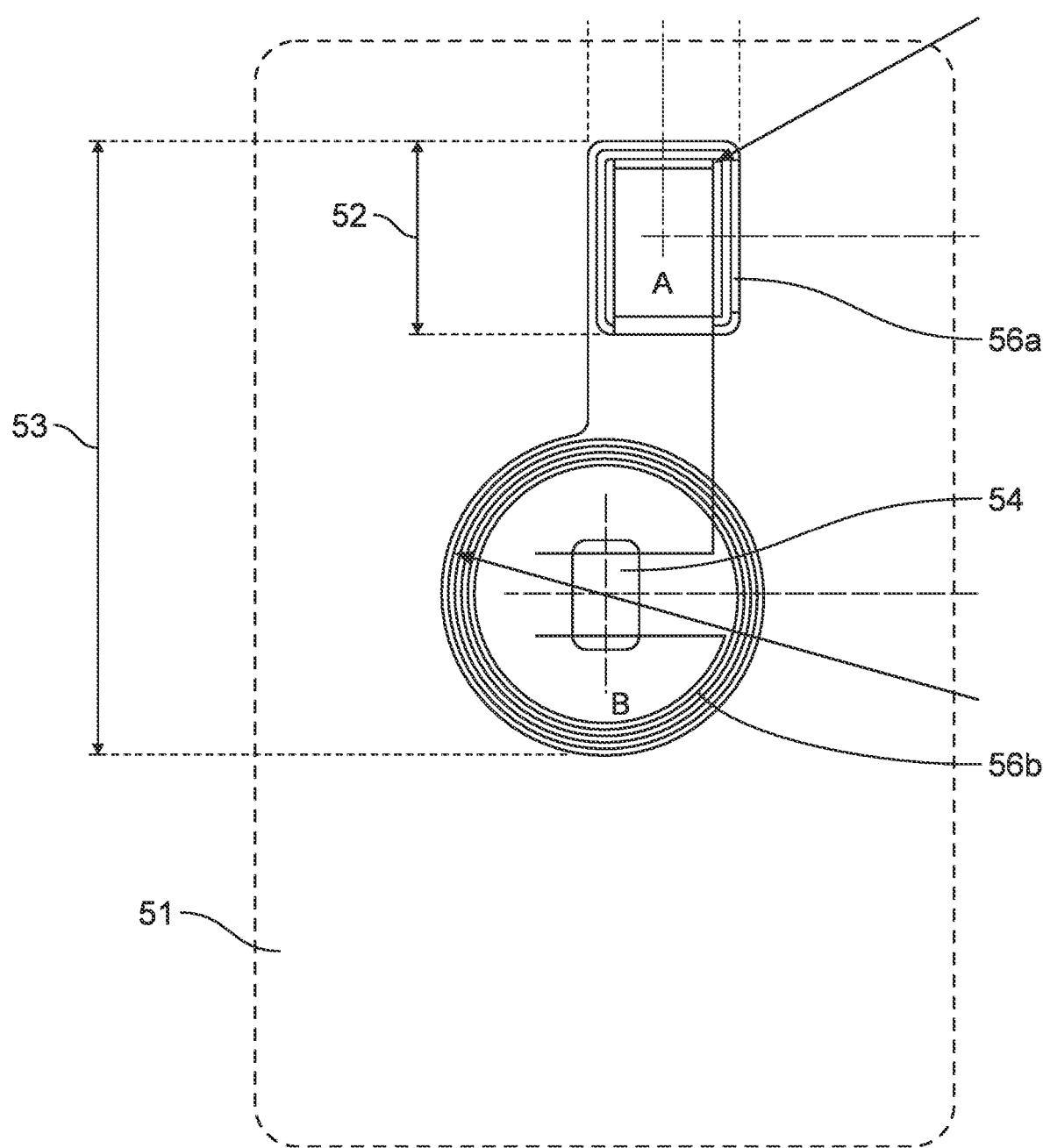
FIG. 5 shows a close up top down view (and a blow up of the antennae of FIG. 3) of the antennae that are to be inserted into the dual interface smart card.

FIG. 3, FIG. 4, and FIG. 5 all show various views of the antennae that are to be used with the cards of the present invention. FIG. 3 shows the results of 24 groups of manufactured antennae (each group contains two antennae) that are to be incorporated into the cards of the present invention. The 24 groups of antennae 36 are present on a sheet 31 and each group 34 is to be cut up so that the groups are separated to be added to the card. The cards are manufactured so that there is a width distance 33 of about 59 microns between the centers of each of the antennae and a length distance 32 of about 92.5 microns. The individual groups 34 are to be cut at the dotted lines so that they can be incorporated into the dual interface smart card. The dimensions of each group 34 is about 54 microns by about 85.6 microns. It should be understood that the dimensions of the groups can be modified to some extent but they should, in one embodiment, be between about 50-60 microns in width and between about 80-90 microns in length.

FIG. 4 shows a side view of the antennae sheet 46 incorporated and adjoined to a PVC sheet 44b and a transparent bottom overlay sheet 43b. The widths of the antennae sheet 46 is about 150 microns and the width of the adjoined PVC sheet 44b is about 220 microns and the width of the bottom transparent bottom overlay sheet 43b is about 50 microns. In an embodiment, this is an overlay sheet which is designed to protect the antennae. Accordingly, the total width 41 of the antennae segment inlay is about 400+/−30 microns. The wires from the first antenna 46a can be seen in the figure. The antenna capacitor 47 is associated with the antenna 46a and is designed to receive and/or transmit signals to/from the dual interface smart card using inductive coupling technology thereby allowing communication with card readers.

FIG. 5 shows a close up top down view of an antenna sheet 51 that comprises a first antenna 56a and a second antenna 56b. The first antenna 56a and the second antenna 6b are operationally attached to each other. The total antenna length 53 from the bottom of the second antennae 56b to the top of first antenna 6a is about 47.74 microns, and the first antenna length 52 is about 15 microns. It should be noted that the shape of the total antenna (which comprises the first antenna 56a and the second antenna 56b) is in the shape of the letter "d". Accordingly, the antenna sheet 51 can be cut in the shape of the letter "d" to incorporate a small amount of sheet around the antennae so that it is in the shape of the letter "d" (see the antennae segment inlay 6 in FIG. 1). This cut antennae segment inlay 6 can be incorporated into the card as described herein. It should be noted that in an embodiment, the chip 7 is designed to be positioned so that when the dual interface metal card is made, the chip 7 is designed to be positioned so that it is adjacent the first antenna 56a (see FIG. 1 and FIG. 5). However, it should be understood that the design of the total antenna could be different and the chip could be positioned (as long as it meets the ISO standards) so that it is adjacent the second antenna.

It should be understood that in an embodiment the chip is positioned so that smart card readers can readily read and get associated personal customer indicia associated with card when the card is used by the user. As discussed herein, the dual interface smart card also comprises encryption technology associated with the chip so that non-authorized card readers cannot readily get the associated personal customer indicia associated with the card.

It should be understood that the present invention contemplates and therefore comprises (a) chip(s) and a magnetic stripe(s) and antennas that have the appropriate electronics associated with them so that they can communicate and/or transfer data as is necessary to card readers. Moreover, it should be understood that the appropriate computer related components may also be present in order to perform this function as well. Finally, the cards of the present invention in an embodiment have the proper encryption technology so that only authorized card readers are able to gather/ascertain/retain indicia associated with the card and the user of the card. In one embodiment, the safety features of the card may include technology whereby the magnetic stripe and the computer chip both have separate encryption technologies that work in tandem so that a card reader may be unable to gather/ascertain and/or retain indicia associated with the card or the card user unless the card reader is able to de-encrypt the technology present on the magnetic stripe and the technology on the chip. In an alternate embodiment, the encryption technology of the card may involve having the user have to input a pin number when using the card. Only when the pin number is entered will any data associated with the card or the card user be released to the card reader.

The present invention relates to a dual interface smart card that comprises:
a) an antennae segment inlay,
b) a metal sheet,
c) one or more adhesive layers, and
d) one or more plastic layers,
wherein the antenna segment inlay is cut in a way that it is designed to fit in a metal sheet, that has been cut to accommodate the antenna segment inlay.

In an embodiment, the dual interface smart card, further comprises one or more of a chip, a magnetic stripe, a signature line, or a hologram. In a variation, the dual interface smart card comprises all of a chip, a magnetic stripe, a signature line, and a hologram.

In an embodiment, the metal sheet is one or more members selected from the group consisting of stainless steel, gold, platinum, copper, aluminum, and mixtures thereof. In a variation, the metal sheet comprises stainless steel.

In an embodiment, the one or more plastic layers comprises one or more members selected from the group consisting of polyvinyl chloride acetate, polycarbonate, polylactic acid, acrylonitrile butadiene styrene, and mixtures thereof. In a variation, the one or more plastic layers comprises polyvinyl chloride acetate.

In an embodiment, the antennae segment inlay comprises two antenna. In a variation, the dual interface card further comprises a chip.

In an embodiment, the antennae segment inlay comprises a first antenna and a second antenna, the first antenna positioned to be adjacent to the chip when the card is assembled.

In an embodiment, the present invention relates to the dual interface smart card described above, wherein the dual interface smart card further comprises a chip, a magnetic stripe, a hologram and a signature line, the metal sheet comprising stainless steel, the one or more plastic layers comprise polyvinyl chloride acetate, the antennae segment inlay configured to be adjacent the chip, and the magnetic stripe and the chip having encryption technology associated with the magnetic stripe and the chip.

In an embodiment, the encryption technology of the magnetic stripe and the encryption technology of the chip work in tandem so as to prevent an unauthorized card reader from accessing indicia associated with the dual interface smart card. In a variation, the encryption technology of the magnetic stripe and the encryption technology of the chip require that a PIN also be used to access the indicia associated with the dual interface smart card. In a variation, the encryption technology further requires a signature of the user.

In an embodiment, the dual interface smart card further comprises one or more transparent plastic overlay layers. In a variation, the one or more transparent plastic overlay layers are present on the outside of the dual interface smart card. In an embodiment, the dual interface smart card comprises two adhesive layers, two plastic layers, and two transparent plastic overlay layers.

In an embodiment, the present invention relates to a method of making a dual interface smart card, said smart card comprising:
a) an antennae segment inlay,
b) a metal sheet,
c) one or more adhesive layers, and
d) one or more plastic layers, wherein the one or more adhesive layers are used to affix and position the antennae segment inlay in the metal sheet to generate a metal antennae sheet, and to adjoin the one or more plastic layers to the metal antennae sheet, wherein the metal sheet and the antennae segment inlay have both been cut. In a variation, the cut is made in the metal sheet and the antennae segment inlay so that the antennae segment inlay fits snuggly in the metal sheet. By snuggly, it is meant that there is less than one micron distance between the outside of the antennae segment inlay and the metal sheet. In an embodiment, the antennae segment inlay is a "d" shape.

In a variation, the method further comprises one or more steps of prepressing, printing, die cutting, assembling, laminating, punching, mechanizing, polishing, finishing, and/or packaging the dual interface smart card. In a variation, the method comprises all of prepressing, printing, die cutting, assembling, laminating, punching, mechanizing, polishing, finishing, and packaging the dual interface smart card. In a variation, the method further comprises performing quality control testing. In a variation, the one or more adhesive layers comprises a heat activated adhesive. In a variation, adhesion by the heat activated adhesive occurs at 130-150° C.

In an embodiment, the present invention relates to a dual interface metal card that behaves like a plastic card, but can be read from both sides, while simultaneously complying with all the standardization requirements (e.g., from the governments) and other requirements that may be given by purchasers and/or franchises.

The following references are incorporated by reference in their entireties for all purposes.
U.S. Pat. No. 10,198,686
US Patent Application Publication No. 2015/0206047 A1
US Patent Application Publication No. 2015/0235122 A1
US Patent Application Publication No. 2016/0180212 A1
WO Patent Application Publication No. 2014/113765 A1
WO Patent Application Publication No. 2014/003409 A1
FR 2936075 A1

It should be understood and it is contemplated and within the scope of the present invention that any feature that is enumerated above can be combined with any other feature that is enumerated above as long as those features are not incompatible. Whenever ranges are mentioned, any real number that fits within the range of that range is contemplated as an endpoint to generate subranges. In any event, the invention is defined by the below claims.

We claim:

1. A dual interface smart card that comprises:
a) an antennae segment inlay,
wherein the antennae segment inlay comprises two antennae;
b) a metal sheet;
c) one or more adhesive layers;
d) one or more plastic layers; and
e) a chip;
wherein the antennae segment inlay is cut in a way that it is designed to fit in a metal sheet, that has been cut to accommodate the antennae segment inlay; and
wherein the antennae segment inlay comprises a first antenna and a second antenna, with the first antenna positioned adjacent to the chip.

2. The dual interface smart card of claim 1, further comprising one or more of a magnetic stripe, a signature line, or a hologram.

3. The dual interface smart card of claim 2, wherein the dual interface card has all of the magnetic stripe, the signature line, and the hologram.

4. The dual interface smart card of claim 1, wherein the metal sheet is one or more members selected from the group consisting of stainless steel, gold, platinum, copper, aluminum, and mixtures thereof.

5. The dual interface smart card of claim 4, wherein the metal sheet is stainless steel.

6. The dual interface smart card of claim 1, wherein the one or more plastic layers comprise one or more members selected from the group consisting of polyvinyl chloride acetate, polycarbonate, polylactic acid, acrylonitrile butadiene styrene, and mixtures thereof.

7. The dual interface smart card of claim 1, further comprising a chip, a magnetic stripe, a hologram and a signature line, the metal sheet comprising stainless steel, the one or more plastic layers comprise polyvinyl chloride acetate, and the magnetic stripe and the chip having encryption technology associated with the magnetic stripe and the chip.

8. The dual interface smart card of claim 7, wherein the encryption technology of the magnetic stripe and the encryption technology of the chip work in tandem so as to prevent an unauthorized card reader from accessing indicia associated with the dual interface smart card.

9. The dual interface smart card of claim 8, wherein the encryption technology of the magnetic stripe and the encryption technology of the chip require that a PIN also be used to access the indicia associated with the dual interface smart card.

10. The dual interface smart card of claim 1, further comprising one or more transparent plastic overlay layers.

11. The dual interface smart card of claim 10, wherein the dual interface smart card comprises two adhesive layers, two plastic layers, and two transparent plastic overlay layers.

12. A method of making a dual interface smart card, said smart card comprising:
a) an antennae segment inlay,
b) a metal sheet,
c) one or more adhesive layers, and
d) one or more plastic layers,
said one or more adhesive layers being used to affix and position the antennae segment inlay in the metal sheet to generate a metal antennae sheet, and to adjoin the one or more plastic layers to the metal antennae sheet, wherein the metal sheet and the antennae segment inlay have both been cut.

13. The method of claim 12, wherein the method further comprises one or more steps of prepressing, printing, die cutting, assembling, laminating, punching, mechanizing, polishing, finishing, and/or packaging the dual interface smart card.

14. The method of claim 13, wherein the method comprises all of prepressing, printing, die cutting, assembling, laminating, punching, mechanizing, polishing, finishing, and packaging the dual interface smart card.

15. The method of claim 14, wherein the method further comprises performing quality control testing.

16. The method of claim 13, wherein the one or more adhesive layers comprises a heat activated adhesive.

17. The method of claim 16, wherein adhesion by the heat activated adhesive occurs at 130-150° C.

\* \* \* \* \*